Aug. 4, 1964 K. HÜLCK ETAL 3,142,887
METHOD OF MAKING A SPLIT ANNULAR TOLERANCE RING
Filed Sept. 14, 1960 2 Sheets-Sheet 1
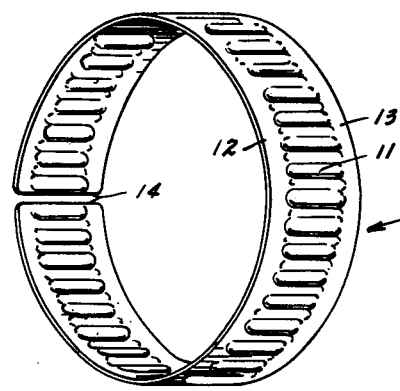
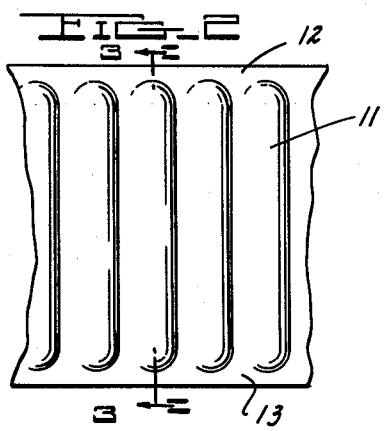
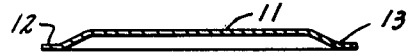
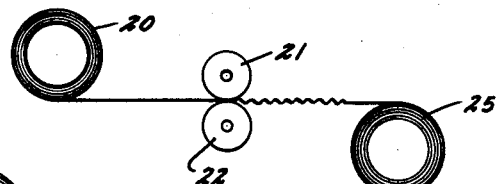
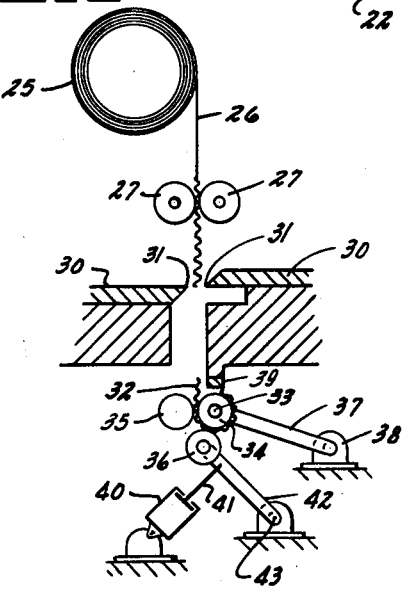

United States Patent Office 3,142,887
Patented Aug. 4, 1964

3,142,887
METHOD OF MAKING A SPLIT ANNULAR TOLERANCE RING
Karl Hülck, Bad Kissingen, and Fritz Schultes, Schweinfurt, Germany, assignors to Deutsche Star Kugelhalter G.m.b.H., Schweinfurt, Germany
Filed Sept. 14, 1960, Ser. No. 55,968
3 Claims. (Cl. 29—148.4)

The present invention relates to a method of making elastic, corrugated metallic rings and more particularly this invention relates to a method of making such rings, commonly utilized as tolerance rings, by a rolling, heat treating and forming process without deformation of the finished ring during heat treatment.

The present invention is concerned with the manufacture of tolerance rings of the type disclosed in the co-pending application of Dix and Wehr, Serial No. 753,917, filed August 8, 1958, now Patent No. 3,061,386, and assigned to the assignee of the present invention. More particularly, such tolerance rings are formed of metal which is heat treated so as to be resiliently deformable, the rings having undulations therein defining corrugations of substantial individual extent formed medially between annular end portions of constant radius. In use, the annular axial end portions contact one of the assembled machine elements, such as a bearing race or the like, while the other periphery defined by the extremities of the corrugations contact the other of the machine elements, such as the walls of the bearing recess, a bearing shaft, or the like.

Prior to the present invention, such rings have been made by the roll forming of steel stock, followed by deformation of the undulated or corrugated stock to an annular configuration which is then heat treated to impart the desired resiliency to the material constituting the ring. During the heat treatment, substantial distortion of the finished ring may occur and it has been necessary to retain the ring in its annular configuration during such heat treatment in order to prevent excessive distortion. Various means of retention of the ring during heat treating have been tried, including riveting the ends of the rings together, wiring the ends of the ring to one another, or even placing the rings within a heat treatment sleeve. In any event, the rings must be individually handled prior to and after the heat treatment, and, even so, the prevention of distortion has constituted a major problem in the manufacture of such rings.

The present invention now proposes a new and different approach to the manufacture of such rings in which the rings are individually formed only after heat treatment. By the process of the present invention, the rings are undulated or corrugated in strip form rewound into a coil, heat treated and then severed and formed into the rings only after the heat treatment. Thus, there is no distortion of the formed ring.

An important object of the present invention is the provision of a method of making split annular tolerance rings having a corrugated peripheral configuration by initially corrugating strip stock, recoiling the strip stock, heat treating the strip stock in its coiled form, severing lengths of the heat treated and corrugated stock, and forming the severed lengths to the desired annular configuration of the final split rings.

Other objects of this invention will appear in the following description and appended claims, reference being had to the accompanying drawings forming a part of this specification wherein like reference characters designate corresponding parts in the several views.

On the drawings:
FIGURE 1 is a perspective view of a split annular tolerance ring made in accordance with the method of the present invention;

FIGURE 2 is a developed view of the outer periphery of the tolerance ring of FIGURE 1;

FIGURE 3 is a sectional view taken along the plane 3—3 of FIGURE 2;

FIGURE 4 is a schematic illustration of the method of forming strip stock to a corrugated configuration suitable for making a ring as illustrated in FIGURES 1 through 3;

FIGURE 5 is a somewhat schematic view of an apparatus for forming the corrugated and heat treated strip stock into the annular split tolerance ring of the FIGURES 1 through 3;

As shown on the drawings:

Figure 6:
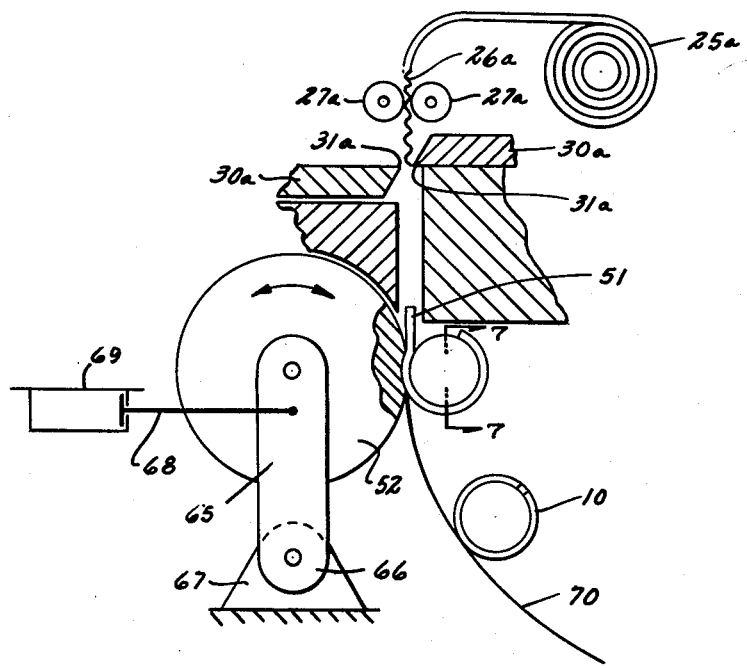
FIGURE 6 is a view similar to FIGURE 5 illustrating a different form of apparatus of the present invention.

In FIGURE 1, reference numeral 10 refers generally to a split annular tolerance ring of the type fully disclosed in the co-pending application of Willy Dix et al., Serial No. 753,917, filed August 8, 1958, now Patent No. 3,061,-386, and assigned to the assignee of the present invention. Such tolerance rings 10 suitably comprise that treated steel strips of great resiliency and having a peripheral surface defined by corrugations 11 axially interposed between substantially annular marginal strips 12 and 13 which are of substantially constant radius. The ends 14 of the strip are spaced, thereby giving the ring its split annular configuration. The marginal edges 12 and 13 stabilize the corrugations 11 which are of low frequency and high amplitude as fully explained in the above-identified co-pending application.

The present invention is concerned with the method of making the split annular tolerance ring of FIGURE 1 and with the apparatus for making such a ring, but not with the ring per se.

In accordance with the method of the present invention, the first step is as illustrated in FIGURE 4 of the drawings, wherein a coil of steel strip 20 is passed between a pair of crimping rolls 21 and 22 of suitable contour to impart to the strip the corrugations 11 intermediate the annular portions 13. The crimped or formed strip is then again coiled, as at 25, and heat treated in the desired manner to impart the necessary inherent resiliency to the strip.

Figure 7:
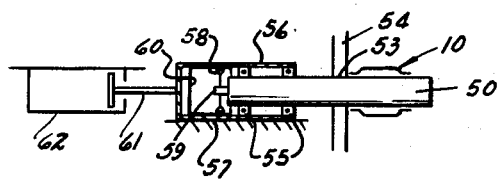
FIGURE 7 is a sectional view taken along the plane 7—7 of FIGURE 6.

Following the heat treatment, the coil 25 is transferred to the apparatus illustrated in FIGURE 5 of the drawings or the apparatus illustrated in FIGURES 6 and 7 of the drawings.

Considering first the apparatus of FIGURE 5, a strip is fed vertically, as at 26, between a pair of feeding and guiding rolls 27 to depend between a pair of shears or cutting elements 30 reciprocated by suitable means and having cooperating cutting elements or shearing edges 31 energizable in timed sequence with the advancement of the strip portion 26 to sever the strip stock from the coil 25 as lengths 32 sufficient to form a complete ring 10. This sheared strip is then fed into contact with a driven mandrel 33 having thereon a radially enlarged forming portion 34 about the periphery of which the strip 32 is urged by a guide roll 35 and a forming roll 36. The mandrel 33 is driven by suitable means, as by a belt 37 and an electric motor 38, while the rolls 35 and 36 are not driven, other than by their contact with the severed strip 32.

The roll 35 is fixed in peripherally spaced relation to the enlarged mandrel portion 34, and the roll 36 is urged against the strip by suitable means, as by a fluid pressure cylinder 40 having a piston rod 41 pivotally connected to link 42 supporting the roll 36 for arcuate movement about a fixed pivot point 43. The split annular sleeve formed on the periphery of the enlarged portion 34 of the mandrel 33, assumes its annular configuration, as shown in FIGURE 1, by virtue of the cooperating forming pressures exerted by the rolls 35 and 36.

Positioned adjacent the periphery of the mandrel portion 34 is an abutment 39 against which the forward end of the sleeve 10 abuts when the sleeve is fully formed. Further power rotation of the surface 34 will force the split edges of the sleeve open and the sleeve will spring from the mandrel portion 34 and fall therefrom by gravity, the cylinder 40 being operated to retract the piston 44 and move the roll 36 away from the enlarged periphery 34 of the mandrel 33, so as to free the finished ring 10 for such movement.

In that form of the invention shown in FIGURES 6 and 7, substantially the same coil feeding arrangement is provided, utilizing feeder rolls 27a for advancing the strip 26a from the coil 25a to be sheared by cutting elements 30a having cutting edges 31a, as heretofore described in connection with FIGURE 5 of the drawings.

After shearing, a length 51 of sheared strip stock drops into the nip between a forming mandrel 50 and a resiliently deformable, relatively larger roll 52 formed of rubber or the like.

The mandrel 50 preferably is of the design illustrated in FIGURE 7 of the drawings wherein the mandrel is elongated to project through the aperture 53 defined by a pair of opposed stripping surfaces 54, the mandrel being journaled in spaced bearings 55 within a cylindrical sleeve 56 non-rotatably, but slidably, disposed upon a support surface 57. The mandrel 50 is thus cantilevered at that portion receiving the formed sleeve 10 thereon and is driven by means of a belt and pulley arrangement 58 disposed on a reduced shaft portion 59. The supporting sleeve 56 is cut away, as at 60, to provide for the passage of the drive belt, the cut away portion of the sleeve being connected to the actuating rod 61 of a fluid pressure actuated cylinder 62.

The resilient roller 52 is carried by a pivot arm 65 pivotally anchored, as at 66 to a fixed support 67, and is urged into cooperating relation with the forming mandrel 50 by the actuating rod 68 of a fluid pressure actuated cylinder 69.

The operation of the device of FIGURES 6 and 7 will be readily appreciated, the mandrel 50 and the roll 52 being positioned as illustrated in FIGURE 6 of the drawings to receive therebetween the severed length of undulated, formed and heat treated material 51, the pressure of the resilient forming roll 52 causing the material 51 to lap about the cantilevered end portion of the mandrel 50. Once the strip 51 has been formed to its annular configuration, the cylinder 69 is actuated to retract the forming roll 52 from contact with the strip 51, and the cylinder 62 is simultaneously actuated to pull the mandrel 52 through the stripping aperture 53, thereby stripping the formed annular sleeve 10 from the mandrel and allowing the finished and formed sleeve 10 to exit from the apparatus through an inclined chute illustrated schematically at 70.

Thus it will be seen that the present invention provides a new, novel and extremely simple method for making a split annular tolerance ring or the like wherein preformed and pre-hardened strip material is wound to its annular configuration by means of the apparatus illustrated in FIGURES 5 through 7 of the drawings. Inasmuch as the heat treatment has already been effected, the finished tolerance ring 10 will not be subjected to any distortion forces tending to prevent the formation of accurately dimensioned, geometrically uniform tolerance rings. Further, the formation of the rings to their annular configuration by means of the roll forming apparatus of FIGURES 5 through 7 provides a simple and fool proof method of very rapidly and accurately forming the rings to the desired configuration.

We claim:

1. A method of making a split annular tolerance ring having peripheral corrugations therein said corrugations being elongated axially of the annular ring and having arcuate contact surfaces cooperatively presenting a generally sinusoidal overall peripheral surface, comprising the steps of corrugating a steel strip to form the corrugations thereof to substantially their finished configuration, forming the corrugated strip into a coil, heat treating the coil of corrugated strip, severing from said heat treated coil lengths of corrugated strip sufficient to form an annular ring of the desired dimension, and forming the severed length of heat treated and corrugated strip into a split annular ring.

2. In a method of making a split annular tolerance ring having peripheral corrugations therein said corrugations being elongated axially of the annular ring and having arcuate contact surfaces cooperatively presenting a generally sinusoidal overall peripheral surface, by corrugating a steel strip, severing from said strip a length thereof sufficient to form an annular ring of the desired dimension, and forming the severed length of strip into an annular ring, the improvements of coiling the corrugated strip and heat treating the corrugated coil intermediate the corrugating and the severing steps, so that the formed rings are not subjected to a distorting heat treatment.

3. A method of making a split annular tolerance ring having peripheral corrugations therein said corrugations being elongated axially of the annular ring and having arcuate contact surfaces cooperatively presenting a generally sinusoidal overall peripheral surface, comprising the steps of corrugating a steel strip, coiling the corrugated strip heat treating the corrugated coil, severing from said heat treated coil a length of corrugated strip material sufficient to form an annular ring of the desired dimension, and passing the severed length of heat treated and corrugated strip between a pair of forming rolls to deform the strip into an annular ring.

References Cited in the file of this patent

UNITED STATES PATENTS

| | | |
|---|---|---|
| 1,546,195 | Briskin | July 14, 1925 |
| 1,715,268 | Ayers | May 28, 1929 |
| 1,942,451 | Reynolds | Jan. 9, 1934 |
| 2,040,442 | Nieman | May 12, 1936 |
| 2,053,162 | Pfalzgraff | Sept. 1, 1936 |
| 2,283,580 | Sandler | May 19, 1942 |
| 2,480,711 | Calton | Aug. 30, 1949 |
| 2,483,694 | Echols | Oct. 4, 1949 |
| 2,674,782 | Surtees | Apr. 13, 1954 |